Jan. 18, 1927.

I. L. FRIEDLAENDER 1,614,724

BOX FOR TRANSPORTING MOTOR VEHICLES

Filed June 1, 1925    2 Sheets-Sheet 1

INVENTOR.
Isador Leo Friedlaender
BY
J. B. Thomas
ATTORNEY.

Jan. 18, 1927.

I. L. FRIEDLAENDER 1,614,724

BOX FOR TRANSPORTING MOTOR VEHICLES

Filed June 1, 1925      2 Sheets-Sheet 2

INVENTOR.
Isador Leo Friedlaender
BY S. E. Thomas
ATTORNEY.

Patented Jan. 18, 1927.

1,614,724

UNITED STATES PATENT OFFICE.

ISADOR LEO FRIEDLAENDER, OF DETROIT, MICHIGAN.

BOX FOR TRANSPORTING MOTOR VEHICLES.

Application filed June 1, 1925. Serial No. 33,881.

My invention relates to a transportation box for motor vehicles, which is particularly adapted for export purposes.

The primary object of this invention is to reduce transportation costs by providing a box for shipping motor vehicles which is inexpensive in construction, yet light, rigid and capable of withstanding the shocks and stresses to which it may be subjected.

A further object of this invention is to provide a waterproof interlining lodged between layers of board sheeting—thus protecting the waterproof lining from injury occurring through contact with other freight.

Another feature of the invention consists in providing the box with ventilating means to avoid condensation therein during transoceanic shipment.

A further object of the invention is to construct the several walls of the box in the form of shooks, that they may occupy less space when stored until assembled for shipment, and whereby upon reaching the destination they may be returned in a "knocked-down" condition after use for subsequent shipment.

A further object of the invention is to stiffen the box by constructing the walls of overlapping boards or plates forming a laminated sheet in which one layer of boards comprising the laminated wall extends diagonally to the adjacent layer of transversely disposed boards, combining thereby a truss construction, greatly adding to the strength of the structure.

Another feature of the invention consists in the particular framing of the several shooks or walls of the box, whereby they may be stored in shook form until assembled to construct a box.

Another feature of the invention consists in providing a plurality of tie-members nailed to cleats secured to the side walls of the box, which further serve to stiffen and add rigidity to the structure.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 3 is a fragmentary perspective view of one of the end posts secured to the frame and sills of the top and bottom members of the box.

Figure 4 is a fragmentary vertical sectional view showing one of a plurality of cross-ties located directly beneath the cover and nailed to cleats secured to the side walls of the box,—which serve to stiffen the structure and tie the side walls together.

Figure 1:
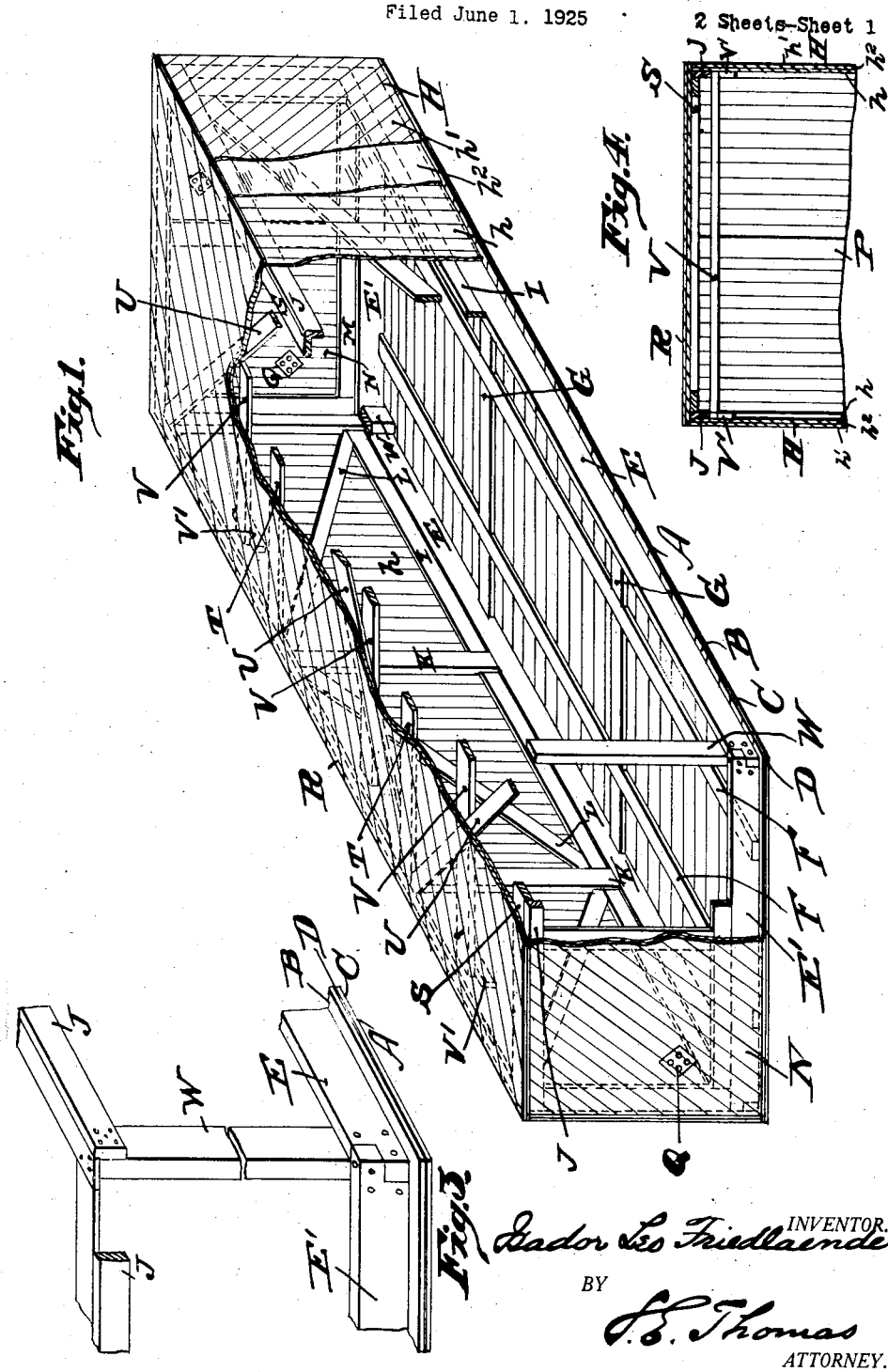
Figure 1 is a perspective view of the box with a portion broken away to show the construction of the several shooks—the lamination forming the walls of the box, and the waterproof interlining lodged between and protected by the laminated sheeting.
Figure 2:
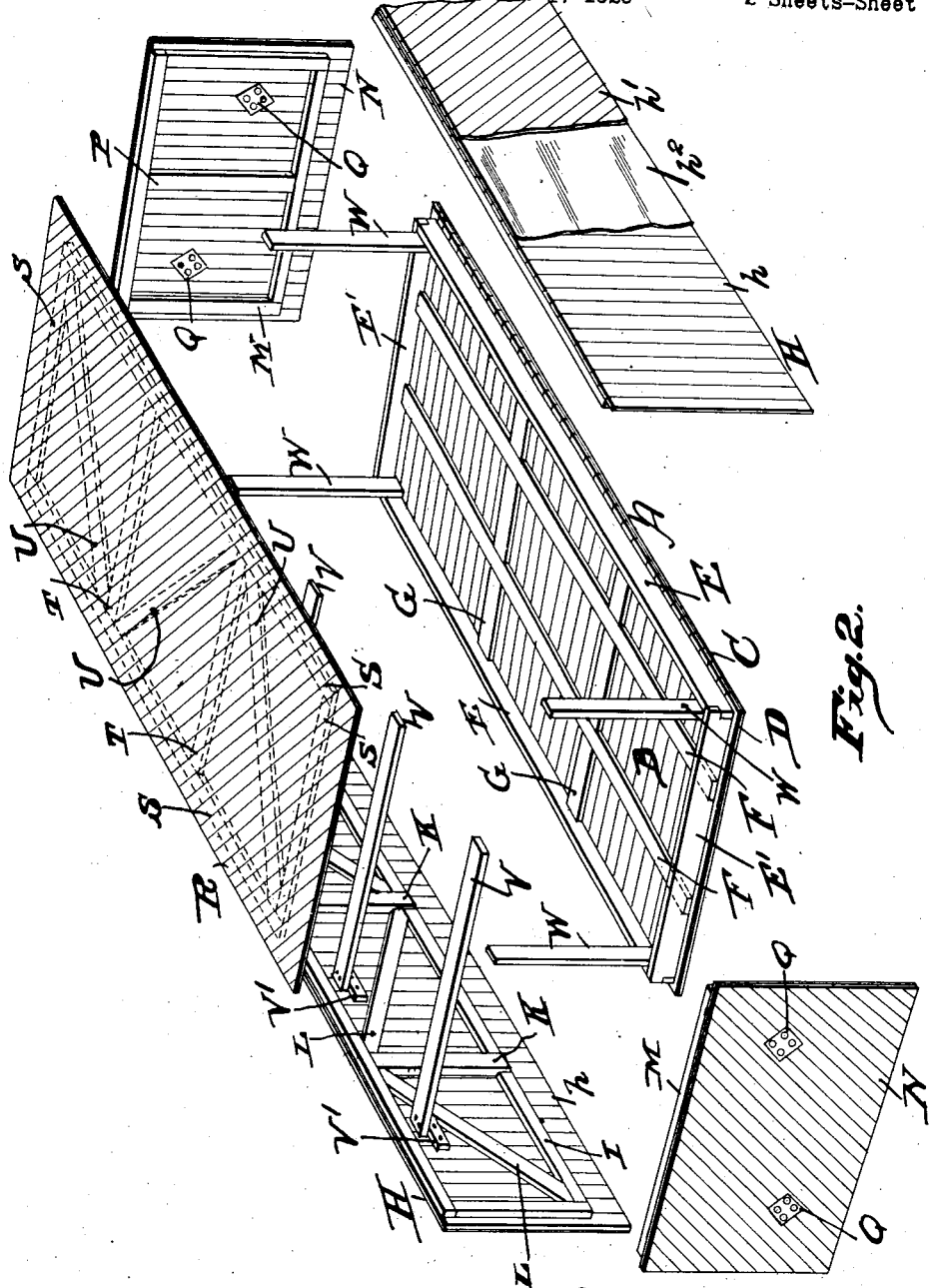
Figure 2 is a perspective view of the several shooks in "knock-down" relation showing the corner posts secured to the sills of the floor or bottom member of the box—the outer layer of one of the shooks being shown broken away to disclose the water-proof lining and the underlaying transverse boards or lamina.

Referring now to the letters of reference placed upon the drawings:

A, denotes the bottom or floor of the box formed of a plurality of transverse and diagonally disposed boards forming overlying sheets B, and C, between which is interposed a suitable waterproof lining or waterproof material D.

E, $E^1$, indicates a rectangular sill spaced from the marginal edge of the floor to which the latter is secured—the side and end members of the sill being connected at the corners by overlapping joints nailed together.

Spaced apart and between the side sills E are longitudinal members F, F, extending into mortises provided in the end sills $E^1$ to receive them.

G designates transverse members spaced from the end sills which are secured to the side sills and to the longitudinal members F, F,—being toe-nailed together at the points of intersection.

H, H, represent laminated wooden side walls preferably constructed of a plurality of transverse and diagonally disposed boards $h$, $h^1$, in abutting relation and overlapping each other with a waterproof interlining $h^2$—the boards being secured to a suitable framing comprising horizontally disposed members I, spaced from the marginal edge of the walls that said members I may rest upon the sills E,—the walls being flush with the edge of the floor and overlapping the side sills.

Secured to the upper edge of the side walls are horizontal members J and at spaced intervals are vertically arranged members K—with diagonally disposed bars L, extending from the upper members to the horizontal members I between each panel formed by the vertical members K.

N denotes the end walls which are also of laminated construction, similar to the side walls and bottom of the box—secured to a rectangular frame M, with suitable brace members P, between the end members of the frame.

Q indicates perforated screens in the end walls that air may circulate through the box to avoid condensation therein.

R designates the cover of the box also formed of laminated wood construction similar to the other walls—the boards being nailed to a suitable rectangular frame S joined together by transverse members T forming a plurality of panels.

U indicates members diagonally intersecting said panels forming suitable braces to stiffen the structure.

V represents a plurality of tie-bars spaced apart and nailed to cleats V¹, in turn secured to the side walls of the box—the tie-bars serving to stiffen and secure the walls against buckling.

W denotes end posts nailed to the floor sills and to the members J at the upper edge of the side walls.

Having now indicated the several parts by reference letters the form and construction of the device will be readily understood:

It will be apparent that constructed as shown a thoroughly rigid box structure, capable of withstanding the stress and hard usage incident to transoceanic travel will result and its relatively light weight will effect a great saving in the cost of transportation.

Furthermore the waterproof interlining is fully protected against damage or injury by the overlapping lamina which presents a smooth outer finished surface, which is not apt to cause, or invite injury from adjacent bodies.

So also the shooks forming the walls of the box may be stored in a relatively small space until required to fabricate a box and following transportation it may be returned "knocked-down" for further shipment.

Having thus described my invention what I claim is:

1. In a transportation box for automobiles, a plurality of knock-down shooks adapted to be secured together to form top, bottom, side and end walls of a box, each shook comprising a frame including side and end sills, the frame of the side walls having vertical posts extending across the frame to divide the side walls into panels, braces extending diagonally across each panel, and cross braces secured to each panel in spaced relation to the top wall of the box and extending to a panel on the opposite side wall to strengthen the box.

2. A transportation box for automobiles comprising a plurality of knock-down shooks adapted to be secured together to form top, bottom, side and end walls of a box, each shook comprising a frame including side and end sills, the side, top and bottom frames having a plurality of posts extending transversely of the frame to divide the same into panels, diagonal braces extending in opposite directions across each panel of the top and side walls and secured to the posts, the bottom frame including an upstanding sill spaced from the marginal edge of the box and being connected at its corners by overlapping joints, transverse boards secured to the various frames in abutting relation, a water-proof material overlying said transverse boards and diagonal boards superimposed on said water-proof material and transverse boards, secured to the frames at their ends only whereby the walls of the box are stiffened and the water-proof material protected, cleats on each panel of the side walls and brace rods secured to the cleats in spaced relation to the top wall of the box and extending across the same to a panel on the opposite side.

In testimony whereof, I sign this specification.

ISADOR LEO FRIEDLAENDER.